Jan. 7, 1964

H. A. STOVER 3,117,319

NAVIGATIONAL SYSTEM

Filed Aug. 13, 1959

INVENTOR.
HARRIS A. STOVER
BY
ATTORNEY

AGENT

_United States Patent Office_

3,117,319
Patented Jan. 7, 1964

3,117,319
NAVIGATIONAL SYSTEM
Harris A. Stover, 1903 46th St., NE., Cedar Rapids, Iowa
Filed Aug. 13, 1959, Ser. No. 833,556
6 Claims. (Cl. 343—105)

This invention relates to navigation systems and more particularly to a navigation system which derives the information from the phase relationship of a plurality of frequencies propagated in a fixed field pattern. The present application is a continuation-in-part of co-pending application Serial Number 664,044, (now abandoned), filed June 6, 1957, and assigned to the assignee of the present invention.

Present day radio azimuth determining systems for navigation systems normally employ rotating antenna field patterns and then compare the phase of the modulation of the received signal produced by the rotating antenna field with the phase of modulation of a signal from a non-rotating field. Most of these systems employ figure-of-eight rotating antenna field patterns to provide the variation in the phase of the transmitted signal. Many different devices have been used to accomplish this comparison aboard the vehicle being navigated, but the ultimate result has been the comparison between the phase of the modulation caused by the rotating field with the modulation phase of the reference signal from a non-rotating field. The phase difference signal which results from this means of comparison is used to obtain information of the azimuth of the receiver from the source of the rotating field signals. This invention provides a novel means of finding the azimuth from a source of propagation which uses the phase relationships between frequencies to determine the azimuth. However, this invention does not rotate the field pattern of any of the propagated frequencies but depends only upon the phase relationships present in a fixed field pattern. Advantages of this system are numerous, and especially valuable is the advantage of the increased signal-to-noise ratio possible because detection of amplitude-modulated signals is not required. Additionally, another prime advantage of this invention is that the control of the phase relationships is much more easily maintained in this system in which the antenna pattern is a fixed field than in previous systems in which the antenna pattern is rotated.

A feature of this invention is a navigation system which generates azimuth information from phase relationships of fixed field patterns. This invention includes phase control systems for controlling the phase relationships of a plurality of propagated frequencies with fixed field patterns, but these control systems are generally much simpler and somewhat less expensive than phase control systems required when the propagated signals emanate from rotating field patterns.

It is an object of this invention to provide a navigation system which is extremely accurate in azimuth information without the use of pulse-type signals. It is a further object of this invention to provide a navigation system for generating azimuth and distance information with no modulation on any of the transmitted signals. It is a still further object of this invention to provide a navigation system where the signal-to-noise ratio is improved by the absence of amplitude modulated signals.

It is yet another object of this invention to provide a navigation system with simple phase control means to control the phase of the propagated signals in fixed field patterns. It is another object of this invention to provide a navigation system which may include both azimuth and distance information with the use of the requisite detection equipment for distance information.

These and other objects of this invention will become apparent when the following description is read in conjunction with the accompanying drawings, in which.

The navigation system of this invention employs at least two antennas with the physical relationship or distance between the antennas being a definite function of the radio frequency to be transmitted by the antennas.

Figure 1:
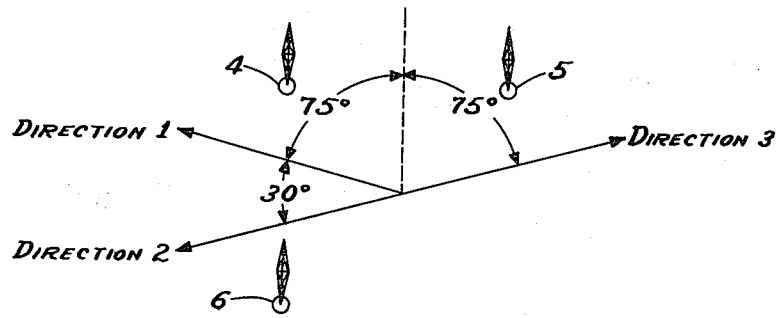
FIGURE 1 is a representation of the azimuth information derived by this system from a plurality of antennas.

Referring now to FIGURE 1, antennas 4, 5, and 6 will be spaced some fraction of the wave length of the radio frequency employed—normally less than one-half of the wave length of the radio frequency which will be transmitted by these antennas.

Figure 2:
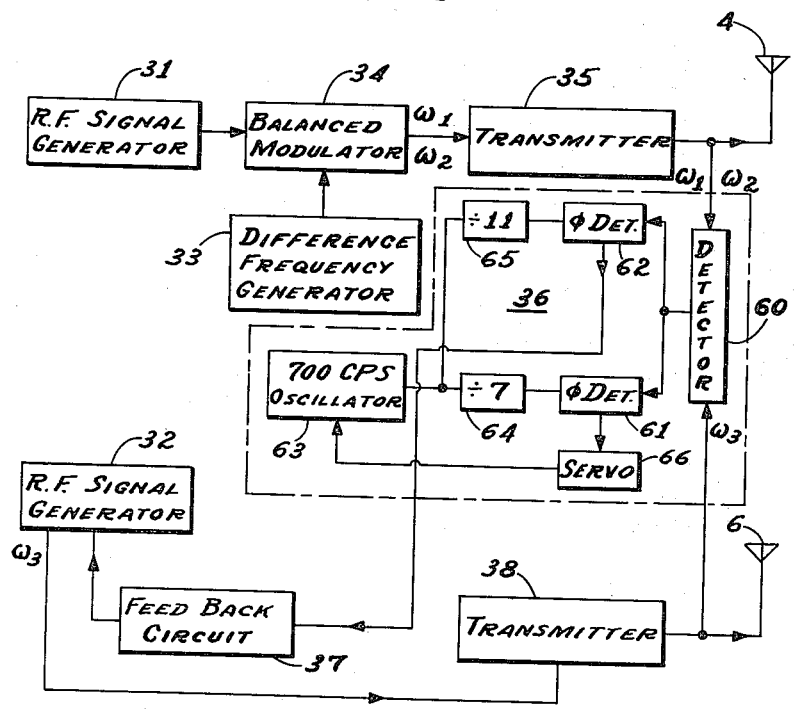
FIGURE 2 is a schematic diagram of one embodiment of a control system for generating the requisite frequencies for this invention; and, FIGURE 3 is a functional representation of an embodiment of a detection and phase measuring means employed in the present invention.

Antennas 4, 5, and 6 will be each individually supplied with a radio-frequency signal for transmission from systems similar to that shown in FIGURE 2. The transmitters form no part of this invention as individual elements and may be of any of the types well known in the art. The radio frequencies which are supplied to the antennas will differ by some low frequency. This low frequency is normally called the difference frequency. In one particular embodiment of this invention, the difference frequencies were specifically chosen so as to be not harmonically related. It is well known to persons skilled in the art that certain phase detectors respond to or are affected by the harmonics of the frequencies being detected. In accordance with the present invention the various radio frequency signals to be transmitted are caused to differ by frequencies so chosen that the various beat frequencies between the transmitted radio frequency signals are not harmonically related. In a particular embodiment to be described the low frequencies by which the various radio frequencies differ are chosen to be particular sub-harmonics of what may be termed a basic difference frequency of 700 c.p.s. An arrangement is therefore provided for dividing the 700 c.p.s. basic difference frequency by 7, 9, and 11 to arrive at 100, 77$\frac{7}{9}$ and 63$\frac{7}{11}$ cycles, respectively. Thus, assuming one of the radio frequencies to be transmitted as being 100 kcs. for example, the four transmitted frequencies utilized in accordance with this invention would be this basic carrier frequency of 100 kc. together with 100,100, 100,077$\frac{7}{9}$ and 100,063$\frac{7}{11}$ cycles. The present invention utilizes the beat frequencies or heterodyne frequencies produced by the difference between preselected ones of the radio frequency signals transmitted to determine bearing information between transmission means and receiving apparatus. It is noted that the six possible first-order heterodyne frequencies produced by the four radio frequencies enumerated above are 100, 77$\frac{7}{9}$, 63$\frac{7}{11}$, 36$\frac{4}{11}$, 22$\frac{2}{9}$ and 14$\frac{14}{99}$ cycles. None of these first order heterodyne frequencies are harmonically related so that any phase detector may easily determine the phase relationship between any of these heterodyne frequencies when referred to the basic difference frequency of 700 cycles of which the difference frequencies are sub-harmonics. The present invention then detects bearing information from the measurement of phase differences between preselected ones of the beat frequencies between the transmitted radio frequencies.

This invention is operable with only two antennas, and for purposes of explanation the functioning of this system with two antennas will be explained first. Assuming only antennas 4 and 6 are utilized, antenna 4 would normally be supplied with two output frequency signals and antenna 6 with a third signal. This third signal would normally be of a higher frequency than one of the two signals applied to antenna 4. Using the frequencies developed above, the antenna 4 would have a signal applied to it of 100,000 cycles and 100,100 cycles, and antenna 6 would have applied thereto a signal with an output frequency of 100,063 7/11 cycles.

Antennas 4 and 6 would be separated some fraction of the wave length of the radio frequency employed—normally less than one-half of the wave length. With the employment of the basic difference frequency scheme outlined above, however, the distance that antennas 4 and 6 would be separated would be equal to one-half wave length at the carrier frequency (100 kc.) further divided by the number that the 700 c.p.s. basic difference frequency is divided in obtaining the basic heterodyned difference frequency for antenna 6 (in the case of these two antennas, the divisor would be the factor 11 used in obtaining the basic heterodyned difference frequency of 63 7/11 c.p.s.). This fractional wave length antenna operation is essential so that the 360-degree phase shifts will be at the 700 c.p.s. basic difference frequency at which all phases would be ultimately compared at the receiving site.

The navigation system of this invention results in ambiguous information if only two antennas are used, but the addition of the third antenna and a fourth frequency removes this ambiguity. The system is being described with respect to two antennas first to simplify the description.

Considering a pair of space-separated antennas, there exists, due to the time differential in transmission time to a receiving site, a fixed phase relationship at all points where the ratio of the distances from the receiver to each antenna is constant. This by definition defines a hyperbolic function and should the antennas be closely spaced the distance ratio, and hence the phase relationship, rapidly approaches the straight line asymptote of the hyperbola. Thus the signal phase relationship lines may, at a distance from the base line between the antennas, be considered a family of straight lines (hyperbolic asymptotes) which will intersect the base line midway between the antennas. Thus in the over-all picture the transmitting antenna configuration, from a practical standpoint, may be considered to appear to a receiver as a point source from which an azimuth determination may be made providing the distance from the receiver to the antenna base line is several times the base line distance per se. In the instant application of this principle, the phase relationship of the heterodyning frequencies between the signals from the two antennas may be considered for practical purposes to be dependent upon the azimuth from the point of reception relative to the axis containing the two antennas. This phase relationship is proportional to the sine of the angle between the receiving point and the axis of the antennas if the point of reception is several radio-frequency wave lengths away and the antennas are spaced a fraction of a wave length apart.

The phase relationship of the transmitted frequencies is the source of the navigation information for this system. Consequently, a detailed explanation of the phase relationship between the signals of this invention is necessary. Antenna 4 will normally transmit a first signal which has a frequency equal to $\omega_1 t$ and has a phase equal to $\phi_1$. In one embodiment of this invention this would be 100,000 cycles with a phase of $\phi_1$. Antenna 4 would also transmit a second signal having a frequency of $\omega_2 t$ and a phase of $\phi_2$. As explained above, this frequency would be 100,100 cycles. Antenna 6 in FIGURE 1 would then transmit a signal having a frequency equal to $\omega_3 t$ and a phase angle of $\phi_3$. The frequency for antenna 6 in the embodiment described above would be 100,063 7/11 cycles. At a receiver site, signals from the transmitters 4 and 6 will produce phase differences related to geographical receiver location when they are mixed. These phase differences may be detected by a phase detector well known to one skilled in the art.

If the signals transmitted by the first antenna, or antenna 4, are mixed, a resultant signal is formed which has a frequency and phase equal to $(\omega_1-\omega_2)t+(\phi_1-\phi_2)$. If the signal from the second antenna, or antenna 6, is mixed with the first signal from the first antenna, namely the $\omega_1$ signal, a resultant signal is formed which has a frequency and phase equal to $(\omega_1-\omega_3)t+(\phi_1-\phi_3)-\phi_4$, where $\phi_4$ is the phase difference between the two signals due to the difference in propagation time elapsing between the two antennas. As is obvious, there is another frequency and phase resultant signal generated by the mixture of signals transmitted by these two antennas 4 and 6. But, inasmuch as this resultant signal contains identically the same information, it need not be used. However, it may be used if necessary to improve the signal-to-noise ratio.

Referring now to FIGURE 1, if the phase of the second signal is $\phi_2$ where both the first and second signals are from antenna 4 and the phase of the third signal from antenna 6 is $\phi_3$, we may derive necessary phase differences for navigation information. Since the frequency $\omega_1$ and the frequency $\omega_2$ are supplied from the same antenna 4, the transfer time from the instant of propagation to the receiving means will be the same for each of these signals. No phase difference will be generated due to a transmission time differential caused by the difference in the lengths of the transmission paths between these signals. The phase angle of the beat frequency of $\omega_1$ and $\omega_2$ will then be determined solely by the difference in phase between $\phi_1$ and $\phi_2$. This is a fixed phase difference which is inserted at the transmitter and is controllable. If a point on a perpendicular bisector to the base line connecting the antennas 4 and 6 is chosen, the propagation time of the frequencies $\omega_1$ and $\omega_3$ will be the same and the phase angle of the beat frequency will be determined solely by the difference in the phase angle between $\phi_1$ and $\phi_3$. If a point is taken at any point on any position of the base line connecting the two antennas other than the midpoint of the base line, one of the signals $\omega_1$ or $\omega_3$ will have to travel a distance greater or less than the other. This will cause a phase shift between these two signals $\omega_1$ and $\omega_3$. Thus, if a semicircle is traversed from a point on the extension of the line connecting the two antennas to a point on the extension of the same line on the opposite side of the two antennas, the phase shift between the signals $\omega_1$ and $\omega_3$ will pass through 360 electrical degrees if the antennas are spaced the correct fractional wave length apart. At any receiver there will also exist the beat frequency and the phase shift between the two signals from the first antenna which does not change with azimuth but only with distance. The phase angle of the beat frequency which does not change with azimuth is used as a comparison signal to determine the phase angle of the beat frequency which does change with azimuth. As a result of the phase shifts or phase differences which are derived from these various beat frequencies, the azimuth to or from the source of propagation may be determined.

The navigation system as described above using only two antennas, namely antennas 4 and 6, has an ambiguity. This ambiguity may be removed by the addition of another antenna 5 which will transmit a fourth signal having a fourth frequency $\omega_4 t$ and a fourth phase $\phi_5$. The ambiguity when using two antennas, such as 4 and 6, is that the output signal will be equally correct in direction 1 or direction 3, as shown in FIGURE 1. When the third antenna 5 is added, the signal from the third antenna is compared with the signals which are already being transmitted from the first antenna to determine a second azimuth indication. With this second azimuth indication compared to the first azimuth indication an unambiguous azimuth indication will be determined. One and only one of the first azimuth indications will coincide with one and only one of the second azimuth indications when these indications are generated by the signals from the first and second, and first and third antennas. The use of the third antenna with the additional transmitted frequencies does require some slight increases in the requisite equipment, such as an additional transmitter and some modification of the receiver.

The azimuth signal which results from the phase comparison between the signals emitted by the various antennas may be supplied to indicating devices which will permit the instantaneous indications of the correct azimuth. One such device might be an indicator where four controlled needles are used with two of the needles always being coincident or parallel with the azimuth. Another such indicator which might be used would be a slotted disc arrangement so that two coincident slots would display a background color and thereby indicate the correct azimuth. Such indicating devices and other equally adaptable devices are well known in the art and may be combined in a well-known manner with the novel navigation system of this invention.

Figure 3:
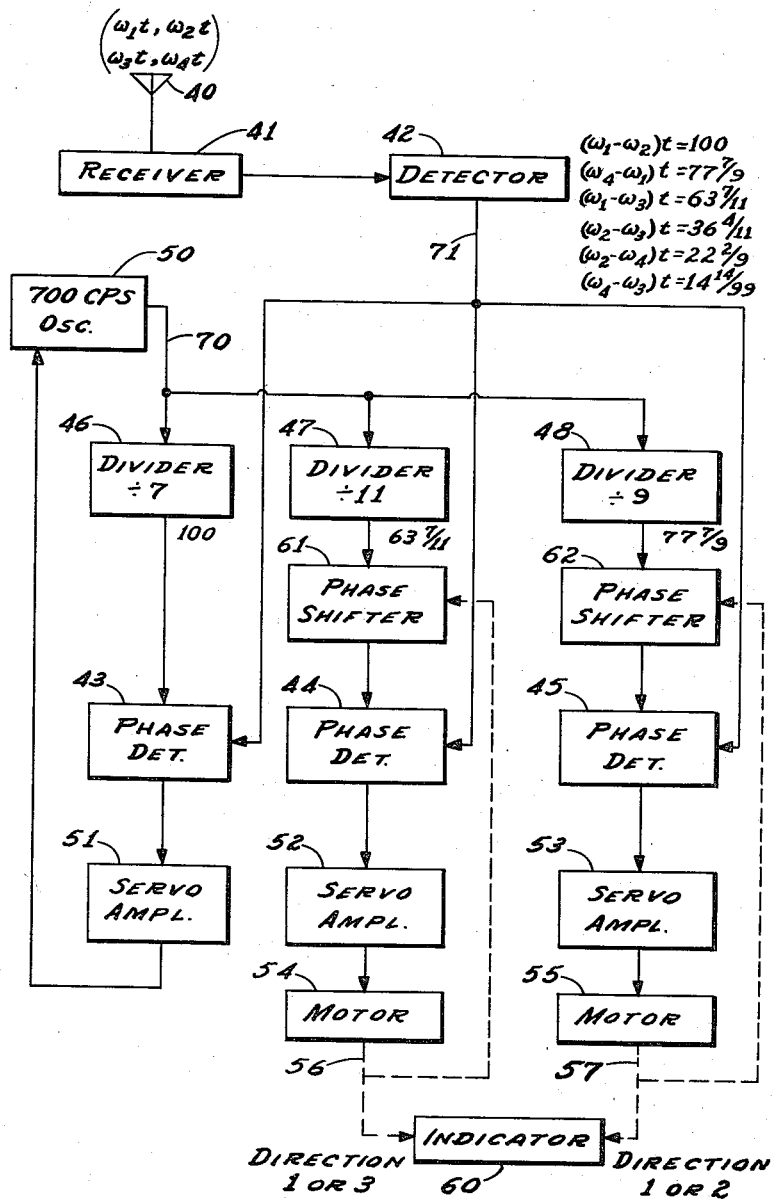

Detection of the phase angle difference between the variation beat frequency signals and indication of the azimuth corresponding to the various phase relationships may be accomplished in a variety of known ways. One method which might be considered preferable and will be described herein in detail includes a scheme of dividing the basic heterodyne frequency of 700 c.p.s. by the divisor factors from which they originally stemmed with ultimate phase comparison at the individual difference frequencies. This arrangement is illustrated functionally in the diagram of FIGURE 3. It is to be noted that FIGURE 3 includes the utilization of the four transmitted frequencies $\omega_1 t$, $\omega_2 t$, $\omega_3 t$, and $\omega_4 t$, which is the situation when three transmitting antennas are incorporated such that an unambiguous azimuth indication is realized. With reference to FIGURE 3 an antenna 40 receives the four transmitted frequencies (or three transmitted frequencies in the case of a two-antenna arrangement) and applies them to a receiver 41 and thence to a detector 42 from which the six possible first order heterodyne frequencies are detected. These six first order heterodyne frequencies, as previously described, result from all first order beats between the four incoming frequencies and are so previously chosen that none is a multiple of the other such that ultimate phase detector comparison will not be impaired. These six first order heterodynes present in the output 71 of detector 42 are shown to be simultaneously applied to each of three phase detectors 43, 44, and 45. In each of the phase detectors 43, 44, and 45 the six first order heterodyne signals are compared with one of the signals derived from a 700 c.p.s. oscillator in the receiving equipment. This oscillator 50 produces at its output 70 a 700 c.p.s. signal which is applied to each of three frequency dividers 46, 47, and 48, the outputs from which are applied as the second inputs to the previously mentioned phase detectors 43, 44, and 45 respectively.

Since the basic heterodyne frequencies established as difference frequencies at the transmitter site were developed from division of a 700 c.p.s. basic frequency, it is necessary in the phase comparison scheme at the receiver to reinsert or establish a 700 c.p.s. reference oscillation. It is for this purpose that 700 c.p.s. oscillator 50 is included and it validly may be used as a reference since it will be synchronized in accordance with the reference beat frequency of 100 c.p.s. taken from detector 42. The manner in which this 700 c.p.s. oscillation is developed is illustrated in FIGURE 3 in the network including frequency divider 46, phase detector 43, and a servo amplifier 51. The output 70 from the 700 c.p.s. oscillator 50 is divided by a factor of 7 in divider 46 such that a 100 c.p.s. output therefrom is applied as a first input to phase detector 43. The second input to phase detector 43 is that of the six first order heterodyne signals emanating from detector 42. Phase detector 43 thus compares the 100 c.p.s. $(\omega_1-\omega_2)t$ difference frequency with the 100 cycle signal from divider 46. It should be here mentioned that all other possible first order heterodyne frequencies are also applied to phase detector 43, but since none is a multiple of the other, phase detections in phase detector 43 may be performed to develop a direct-current output signal proportional to the difference in the 100 c.p.s. inputs. The other beat frequencies applied to the phase detector will produce alternating-current signals and may be removed by the incorporation of a long integration time filter within the phase detector such that the output from phase detector 43 is a direct-current error voltage proportional to the difference in phase between the 100 c.p.s. inputs. The output from phase detector 43 might then be applied to a servo amplifier 51 and the output from servo amplifier 51 may be used to control the phase of the 700 c.p.s. oscillator. Thus the phase of the 700 c.p.s. oscillator 50 is directly established as the reference since it is controlled by the $(\omega_1-\omega_2)t$ beat frequency emanating from the single ground antenna and whch is the beat frequency which is not a function of geographical position with respect to the transmitting antenna configuration.

In the case of using only antennas 4 and 6 at the transmitting source, the receiving scheme of FIGURE 3 would incorporate a phase shifting operation upon the variable phase $(\omega_1-\omega_3)t$ beat frequency of $63\frac{7}{11}$ c.p.s. With reference to FIGURE 3, the 700 c.p.s. reference oscillator output is applied to a frequency divider 47 which divides by the factor 11 to provide an output of $63\frac{7}{11}$ c.p.s. through a phase shifter 61 to phase detector 44. Phase detector 44 compares this reference $63\frac{7}{11}$ signal with the $63\frac{7}{11}$ c.p.s. basic heterodyne frequency from detector 42—that is, the $(\omega_1-\omega_3)t$ beat frequency. Any difference in phase between the $(\omega_1-\omega_3)t$ beat frequency and the reference frequency as developed in phase detector 44 results in an error voltage being applied to a servo amplifier 52 which in turn might drive a motor 54 to position through mechanical linkage 56 the phase shifter 61 to arrive at a null output from phase detector 44. The shaft position 56 of motor 54 is thus indicative of the phase relationship existing between the $(\omega_1-\omega_3)t$ beat frequency and the reference. The shaft position of motor 54 is indicative, as previously described, of a phase relationship corresponding to either direction 1 or direction 3 (see FIGURE 1). Motor shaft position 56 may then be applied to an indicator 60 to establish the azimuth as being either direction 1 or direction 3.

Now if the ambiguity in azimuth indication is to be removed, the incorporation of the $\omega_4 t$ transmitted signal from the third antenna 5 may readily be included to remove the ambiguity. As shown in FIGURE 3, the six possible first order heterodyne frequencies from detector 42 might be applied to the third phase detector 45. The output from the 700 c.p.s. oscillator 50 is applied through frequency divider 48 and phase shifter 62 as the reference input to phase detector 45. Frequency divider 48 divides the 700 c.p.s. reference by a factor of 9 to arrive at an output frequency of $77\frac{7}{9}$ c.p.s. This $77\frac{7}{9}$ c.p.s. signal is compared in phase detector 45 with the $(\omega_4-\omega_1)t$ heterodyne frequency from detector 42. Any discrepancy in phase results in a direct-current error voltage being applied to servo amplifier 53 to drive a motor 55 which through its output shaft 57 positions phase shifter 62 to adjust for any difference in phase and thus arrives at a null condition in phase detector 45. The shaft position 57 of motor 55 is then indicative of directions 1 or 2 and may be applied as a second input to indicator 60.

As in the case of reference phase detector 43 which functions to establish the correct phase of the 700 c.p.s. reference oscillator 50, variable phase detectors 44 and 45 which are used in establishing azimuth information have applied in addition to the $63\frac{7}{11}$ c.p.s. and $77\frac{7}{9}$ c.p.s. signals respectively, all of the remaining possible first order heterodyne beat frequencies. As in the case of phase detector 43, these remaining unused signals result in the development of alternating-current signals which may readily be removed by a long time integration filter in the phase detectors 44 and 45 such that the output is a direct-current voltage indicative of phase differences between the desired heterodyne frequencies only.

Indicator 69 having been supplied with inputs indicative of directions 1 or 3 and 1 or 2 respectively is then adaptable to establish a direct indication of the actual azimuth as being direction 1. It is thus seen that the choice of difference frequencies used in establishing the transmitted signals at the transmitting source may readily be operated upon at the receiver source to re-establish the basic phase reference in conjunction with the $\omega_1 t$ and $\omega_2 t$ frequencies and to compare this reference phase with the phase of the $\omega_3 t$ and $\omega_4 t$ frequencies, the last signals varying in phase as a function of the geographical location of the receiving apparatus with respect to the transmitting site. It is further seen that by the proper choice of basic heterodyne frequencies at the transmitting site the necessary phase comparisons at the receiver may be made without interference from other possible first order heterodyne signals which will be present.

As described above, the amount of phase shift necessary to maintain these various signals in phase synchronism is an indication of the azimuth to the transmitting station. The phase of the beat frequency signals resulting from the signals emitted from the first antenna is independent of azimuth. The phase of the beat frequency signals resulting from the signals emitted by the first and second antennas is a function of the azimuth from the receiver due to the physical separation between the first and second antennas, and the beat frequency signals resulting from the signals emitted by the first and third antennas are a function of the azimuth from the receiver due to the physical separation between the first and third antennas.

One method of maintaining the requisite phase difference between the signals at the transmitters is with resolvers such as described herein. A more desirable method of maintaining the requisite phase differences is shown in FIGURE 2. Here the two radio-frequency generators 31 and 32 each generate a carrier frequency for the navigation system. To the radio-frequency signal generated by the generator 31 a difference frequency is mixed in the balanced modulator 34. This difference frequency is generated by a difference-frequency generator 33 which may be any frequency generating scheme well known in the art. If the navigational system is to include distance measuring equipment, the phase of the difference frequency between the output signals from the first antenna must be accurately controlled as a function of time. This means that the difference-frequency generator in this instance needs to be a generator of closer tolerances than if the distance measuring equipment is not included as part of the navigation system. The output signals from the balanced modulator 34 are $\omega_1$ and $\omega_2$. These signals are applied to the transmitter 35 and thence to the first antenna 4. The transmitter 35, as described before, is any of the transmitters well known in the art. The radio-frequency signal generator 32 generates the frequency $\omega_3$ which differs from the frequencies $\omega_1$ and $\omega_2$ by the desired amount as described above. Radio-frequency generator 32 applies signals of $\omega_3$ frequency to the transmitter 38. Phase locking circuitry 36 recieves the signals $\omega_1$, $\omega_2$, and $\omega_3$ and compares the phase of the beat frequencies $(\omega_1-\omega_2)$ and $(\omega_1-\omega_3)$. If the phase of $(\omega_1-\omega_3)$ does not have a predetermined relationship with that of $(\omega_1-\omega_2)$, the phase locking circuitry 36 generates an error signal which is applied to the feedback circuit 37 of the radio-frequency generator 32 to be sure that the desired phase of $\omega_3$ is generated. The feedback circuit 37 may be a reactance tube or some other controlled type of reactance which in combination with a crystal oscillator will generate the desired phase in an output signal. The output signals are sampled directly from the antenna to eliminate erroneous phase shifts which might be generated in a transmitter if the signals were sampled before the final amplification.

The manner in which the necessary phase control is established at the transmitter site might be further discussed using the specific difference scheme previously discussed, where the $\omega_1$ and $\omega_2$ frequencies transmitted by antenna 4 would be 100,000 and 100,100 respectively and the $\omega_3$ frequency transmitted by antenna 6 would be 100,063$\frac{7}{11}$. With further reference to FIGURE 2, radio-frequency signal generator 31 would supply a signal of 100,050 c.p.s. and difference-frequency generator 33 would supply a 50 c.p.s. signal to balanced modulator 34, resulting in sum and difference outputs therefrom of 100,100 and 100,000 c.p.s. respectively. The latter frequencies correspond to $\omega_2$ and $\omega_1$ as transmitted by antenna 4.

Radio-frequency signal generator 32 would then generate the predetermined $\omega_3$ frequency of 100,063$\frac{7}{11}$ c.p.s. and supply it to transmitter 38 for transmission by antenna 6. The establishment of the necessary phase relationship between the $\omega_1$, $\omega_2$, and $\omega_3$ signals is accomplished by their comparison in phase locking circuitry 36 which would comprise circuitry similar to that previously described concerning the receiving equipment—that is the comparison of the $\omega_1-\omega_3$ beat with the $\omega_1-\omega_2$ fixed phase reference beat. Thus phase locking circuitry 36 might accordingly include a detector 60 from which the $(\omega_1-\omega_2)$ and $(\omega_1-\omega_3)$ beats may be developed and these beats would be applied to each of two phase detectors 61 and 62 respectively. A 700 c.p.s. oscillator 63 would supply an output to each of two dividers 64 and 65, the first dividing by a factor of 7 and supplying a 100 c.p.s. signal to the $\phi$ detector 61 and the second dividing by a factor of 11 and supplying a 63$\frac{7}{11}$ c.p.s. signal to phase detector 62. The output of the 100 c.p.s. $\phi$ detector 61 would then be utilized to control the 700 c.p.s. oscillator 63 in accordance with the $(\omega_1-\omega_2)$ 100 c.p.s. reference beat through a servo 66 and the output of the 63$\frac{7}{11}$ c.p.s. $\phi$ detector 62 would be supplied through feedback circuit 37 to control the frequency of the $\omega_3$ radio-frequency signal generator 32 of FIGURE 2 to insure the establishment of a fixed phase relationship with the $\omega_1$ and $\omega_2$ transmissions.

If the third antenna and fourth frequency are used, an additional radio-frequency generator, an additional divider and phase detector, feedback circuit and transmitter are necessary to supply the fourth signal $\omega_4$ to the third antenna. The additional phase detector would compare the $\omega_1-\omega_4$ beat frequency with a reference frequency derived from a further appropriate division of the 700 c.p.s. oscillator signal. The accurate control of the phase of the output signals is especially useful when the distance measuring equipment is used in conjunction with the azimuth measuring system of this invention.

The absence of modulation on the signals emitted by these various antennas results in a much better signal-to-noise ratio than is possible with any amplitude-modulated signal. Phase detection of unmodulated signals provides a more accurate detection due to the absence of beat-frequency noise. Noise frequencies resulting from this type of beating action have been referred to as the funneling of noise, and this action does not occur in the phase detection circuit of this invention. This system will operate in regions of relatively weak signals and permits the reduction in the power output of the transmitters with the attendant reduction in cost.

Although this invention has been described with respect to a particular embodiment thereof, it is not to be so limited as changes and modifications may be made therein which are within the full intended scope of the invention as defined by the appended claims.

I claim:

1. A navigation system comprising a first transmission means including a first antenna, said first transmission means propagating first and second output signals, said first and said second signals having a fixed phase relationship and each being of a different frequency, a second transmission means including a second antenna, said second transmission means propagating a third signal of a third frequency differing from said first frequency by a predetermined difference frequency, said third signal having a third phase relationship with said first and said second signals, said first and second antennas being spaced by one-half wavelength at said first signal frequency further divided by an integer by which a basic difference frequency is divided to arrive at said predetermined difference frequency, whereby azimuth from said antennas may be ascertained by comparison of said phase relationship.

2. A navigation system comprising a first transmission means including a first antenna, said first transmission means propagating in a fixed field first and second output signals, a second transmission means including a second antenna, said second transmission means propagating in a fixed field a third signal, said third signal being of a different frequency from said first signal, said third signal possessing a fixed phase relationship with said first and said second signals, said first and second antennas being spaced by one-half wavelength at the frequency of said first signal further divided by an integer by which a basic difference frequency is divided to arrive at the frequency difference between said first and third signals, whereby azimuth from said antennas may be ascertained by comparison of said phase relationships.

3. A navigation system comprising a first transmission means including a first antenna, said first transmission means propagating in a fixed field a first and a second signal, a second transmission means including a second antenna, second transmission means propagating in a fixed field a third signal, said third signal possessing a fixed phase relationship with said first and said second signals, said second and third signals differing from said first signal by predetermined different submultiples of a substantially lower basic difference frequency as obtained by dividing said basic difference frequency by first and second integers respectively, said first and second antennas geographically spaced one-half wave length at said first signal frequency further divided by said second integer, whereby the phase differences between said first, second and third signals are indicia of the azimuth at any point from said point source.

4. A navigation system comprising a first transmission means including a first antenna, said first transmission means propagating first and second signals in a fixed field with a fixed phase relationship between said signals, a second transmission means including a second antenna, a third transmission means including a third antenna, said second transmission means propagating a third signal in a fixed field, said third signal having a fixed phase relationship with said first and said second signals, said third transmission means propagating a fourth signal in a fixed field, said fourth signal having a fixed phase relationship with said first and said second signals, said antennas being geographically spaced such that the base line between said first and second antennas is perpendicular to that between said first and third antennas with the length of said base lines being respectively determined as one-half wavelength at one of said first and second signal frequencies divided by respective integers by which a basic difference frequency is divided to arrive at the differences between said one of said first and second signals and that of said third and fourth signals, whereby the phase differences of said signals at any point are indicia of the azimuth of said point from said antennas.

5. A navigation system comprising a first transmission means including a first antenna, said first transmission means propagating first and second signals in a fixed field with a fixed phase relationship between said signals, a second transmission means including a second antenna, a third transmission means including a third antenna, said antennas being essentially a point source at the frequencies propagated, said second transmission means propagating a third signal in a fixed field, said third signal having a fixed phase relationship with said first and said second signals, said third transmisison means propagating a fourth signal in a fixed field, said fourth signal having a fixed phase relationship with said first and said second signals, each of said first, second, third and fourth signals being of a predetermined different frequency with the frequency differences therebetween being harmonically unrelated submultiples of a basic difference frequency, said antennas being geographically spaced such that the differences between said first and second antennas and between said first and third antennas are equal respectively to one-half wavelength at said first signal frequency further divided by integers by which said basic difference frequency is divided to arrive at the frequency differences between the third and fourth signal frequencies and said first signal frequency, whereby the phase differences between said first, second and third signals at any receiving point are indicia of the azimuth of said point from said point source.

6. A navigation system comprising a first transmission means including a first antenna, said first transmission means propagating first and second signals in a fixed field with a fixed phase relationship between said signals, a second transmission means including a second antenna, a third transmission means including a third antenna, said second transmission means propagating a third signal in a fixed field, said third signal having a fixed phase relationship with said first and said second signals said third transmission means propagating a fourth signal in a fixed field, and said fourth signal having a fixed phase relationship with said first and said second signals, said second, third and fourth signals differing from said first signal by predetermined different submultiples of a substantially lower basic difference frequency as obtained by dividing said basic frequency by first, second and third integers respectively, the base line between said first and second antennas being of a length determined by one-half wave length at said first signal frequency further divided by said second integer, the base line between said first and third antennas being perpendicular to that between said first and second antennas and of a length determined by one-half wave length at said first signal frequency further divided by said third integer, whereby the phase difference between said first and said second signals is indicative of the distance from said antennas and the phase differences between said first, second, third, and fourth signals are indicative of the azimuth of a point from said antennas.

References Cited in the file of this patent
UNITED STATES PATENTS

| Re. 24,891 | Palmer | Oct. 25, 1960 |
| 2,440,755 | O'Brien | May 4, 1948 |
| 2,651,032 | Torcheux et al. | Sept. 1, 1953 |